US007650226B2

(12) United States Patent
Ishizuka et al.

(10) Patent No.: US 7,650,226 B2
(45) Date of Patent: Jan. 19, 2010

(54) FUEL INJECTION SYSTEM WITH LEARNING CONTROL TO COMPENSATE FOR ACTUAL-TO-TARGET INJECTION QUANTITY

(75) Inventors: Kouji Ishizuka, Aichi-ken (JP); Kouichi Sugiyama, Chiryu (JP); Manabu Tsujimura, Anjo (JP); Tetsuya Ohno, Kiyosu (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 12/199,963

(22) Filed: Aug. 28, 2008

(65) Prior Publication Data

US 2009/0063022 A1 Mar. 5, 2009

(30) Foreign Application Priority Data

Aug. 31, 2007 (JP) ............................ 2007-226461

(51) Int. Cl.
*G06F 19/00* (2006.01)
*F02M 15/00* (2006.01)

(52) U.S. Cl. ....................... 701/114; 701/115; 123/434; 123/690

(58) Field of Classification Search ................. 701/103, 701/104, 105, 114, 115; 123/434, 436, 478, 123/480, 690
See application file for complete search history.

(56) References Cited

U.S. PATENT DOCUMENTS

| | | | | |
|---|---|---|---|---|
| 5,491,631 | A | 2/1996 | Shirane et al. | |
| 5,755,212 | A * | 5/1998 | Ajima | 123/674 |
| 6,543,220 | B2 * | 4/2003 | Yoshida et al. | 60/285 |
| 6,725,826 | B2 * | 4/2004 | Esteghlal | 123/295 |
| 6,988,030 | B2 | 1/2006 | Asano et al. | |
| 7,111,455 | B2 * | 9/2006 | Okugawa et al. | 60/295 |
| 7,305,967 | B1 * | 12/2007 | Hagari et al. | 123/403 |
| 7,578,288 | B2 * | 8/2009 | Thiel et al. | 123/690 |
| 2002/0139360 | A1 * | 10/2002 | Sato et al. | 123/698 |
| 2003/0164166 | A1 | 9/2003 | Takeuchi et al. | |
| 2003/0233997 | A1 | 12/2003 | Kawaguchi et al. | |

(Continued)

FOREIGN PATENT DOCUMENTS

JP 05-172701 7/1993

(Continued)

OTHER PUBLICATIONS

Japanese Office Action dated Jun. 23, 2009, issued in corresponding Japanese Application No. 2007-226461, with English translation.

*Primary Examiner*—John T Kwon
(74) *Attorney, Agent, or Firm*—Nixon & Vanderhye, PC

(57) ABSTRACT

A fuel injection system designed to execute a learning operation to spray fuel through fuel injectors at each of given pressures of the fuel to determine the quantity of fuel sprayed actually from each of the fuel injectors (i.e., an actual injection quantity) into an internal combustion engine. The system calculates a deviation of each of the actual injection quantities from a target quantity to determine an injection correction value required to eliminate such a deviation. The system determines whether each of the injection correction values has an error or not and analyzes the mode in which the errors appear at the injection correction values to specify types of malfunction occurring in the system. The system relearns ones of the injection correction values as determined to have the errors.

16 Claims, 4 Drawing Sheets

U.S. PATENT DOCUMENTS

2005/0092303 A1 5/2005 Oki

FOREIGN PATENT DOCUMENTS

| | | |
|---|---|---|
| JP | 06-066188 | 3/1994 |
| JP | 2003-254139 | 9/2003 |
| JP | 2004-019637 | 1/2004 |
| JP | 2005-155360 | 6/2005 |
| JP | 2005-155601 | 6/2005 |
| JP | 2005-248739 | 9/2005 |
| WO | WO 2007/026887 | 3/2007 |
| WO | 1 930 577 | 6/2008 |

* cited by examiner

LEARNED VALUE DATA MAP

CYLINDER

| FUEL INJECTION PRESSURE ↓ | #1 | #2 | #3 | #4 |
|---|---|---|---|---|
| | G11 | G12 | G13 | G14 |
| | G21 | G22 | G23 | G24 |
| | ⋮ | ⋮ | ⋮ | ⋮ |
| | Gn1 | Gn2 | Gn3 | Gn4 |

FUEL INJECTION SYSTEM WITH LEARNING CONTROL TO COMPENSATE FOR ACTUAL-TO-TARGET INJECTION QUANTITY

CROSS REFERENCE TO RELATED DOCUMENT

The present application claims the benefit of Japanese Patent Application Nos. 2007-226461 filed on Aug. 31, 2007, the disclosure of which is incorporated herein by reference.

BACKGROUND OF THE INVENTION

1. Technical Field of the Invention

The present invention relates generally to a fuel injection system which may be employed with automotive internal combustion engines to learn a deviation of the quantity of fuel actually sprayed by a fuel injector from a target quantity to produce a correction value for correcting an on-duration for which the fuel injector is to be opened to spray the fuel desirably, and more particularly to such a fuel injection system designed to specify malfunctions occurring in the system.

2. Background Art

There are known fuel injection systems for diesel engines which are designed to spray a small quantity of fuel into the engine (usually called a pilot injection) prior to a main injection of fuel in order to reduce combustion noise or NOx emissions. However, a deviation of the quantity of fuel actually sprayed from a fuel injector from a target quantity in the pilot injection will result in a decrease in beneficial effects of the pilot injection.

In order to avoid the above problem, Japanese Patent First Publication No. 2005-155360 proposes a learning control system which is activated when the diesel engine is decelerating, and no fuel is being sprayed into the diesel engine. Specifically, the learning control system instructs a fuel injector to spray a single jet of a target quantity of fuel into the diesel engine, samples a resulting change in speed of the engine to calculate the quantity of fuel actually sprayed from the fuel injector, and determines a correction value for an injection duration for which the fuel injector is to spray the fuel (i.e., an on-duration for which the fuel injector is opened) based on a difference between the target quantity and the actually sprayed quantity of the fuel (which will also be referred to as an actual injection quantity below).

The fuel injection system with the above type of learning control function ensures the accuracy in injecting a desired quantity of fuel into the diesel engine, for example, in the pilot injection event, but however, it is not designed to identity the cause of an error in learned actual-to-target quantity deviation (i.e. the correction value).

SUMMARY OF THE INVENTION

It is therefore a principal object of the invention to avoid the disadvantages of the prior art.

It is another object of the invention to provide a fuel injection system which is designed to execute the learning control of the quantity of fuel to be sprayed into an internal combustion engine and specify the cause of an error in results of the learning control.

According to one aspect of the invention, there is provided a fuel injection system for a multi-cylinder internal combustion engine which may be employed with an automotive common rail fuel injection system. The fuel injection system comprises: (a) fuel injectors each of which sprays fuel into one of cylinders of an internal combustion engine; and (b) an injection controller working to perform a learning control function, a learning error determining function, and a malfunction specifying function. The learning control function is executed when the engine is placed in a given condition to regulate a pressure of fuel to be sprayed from each of the fuel injectors to each of given learning pressures. The learning control function works to inject a learning spray of the fuel into the engine to sample a resulting change in operating condition of the engine to calculate an actual injection quantity that is the quantity of fuel expected to have been sprayed from the each of the fuel injectors and calculating an injection correction value required to bring the actual injection quantity toward a target quantity. The learning error determining function is to make a determination of whether there is an error in each of the injection correction values or not which is calculated at one of the learning pressures for each of the fuel injectors. The malfunction specifying function is to analyze a result of the determination made by the learning error determining function to specify a malfunction occurring with regard to the fuel injection system.

In the preferred mode of the invention, the learning control function executes a learning operation to inject the learning spray of the fuel to calculate the actual injection quantity at each of the learning pressures for each of the fuel injectors. The learning control function determines whether a learning condition in which the given condition is encountered and the each of the learning pressures is reached is met or not each time the learning operation is executed, and wherein when the malfunction specifying function determines that the learning condition continues not to be met for a given period of time, the injection controller stops the learning control function from being performed to determine that the malfunction is occurring in the fuel injection system.

The learning control function executes the learning operation to inject the learning spray of the fuel to calculate the actual injection quantity a given number of times at each of the learning pressures for each of the fuel injectors to determine the injection correction value. The learning control function makes a determination of whether a value of the actual injection quantity is abnormal or not each time the learning operation is executed. When the value of the actual injection quantity is determined to be abnormal, the learning control function discards the value of the actual injection quantity and performs the learning operation additionally to recalculate the discarded value of the actual injection quantity.

The learning control function executes the learning operation the given number of times at each of learning ranges to determine the injection correction value, each of the learning ranges being defined in terms of one of the learning pressures for one of said fuel injectors. When the learning control function determines a plurality of times that the value of the actual injection quantity is abnormal at one of the learning ranges the learning control function determines the one of the learning ranges as an additional learning pressure candidate at which the learning operation is to be executed to calculate the actual injection quantity again to determine the injection correction value and initiates the learning operation at another of the learning pressures, and wherein when the learning operations at all the learning pressures for all the fuel injectors have been completed, the learning control function initiates the learning operation at the additional learning pressure candidate to learn the injection correction value. This enables the injection correction value to be calculated accurately using only the actual injection quantities as having been determined correctly without decreasing them undesirably, which prevents the injection correction value from being abnormal due to noise to avoid an error in determining that some malfunction is occurring in the fuel injection system.

When the injection correction value exceeds a given guard value, the learning error determining function determines that there is the error in the injection correction value.

The learning control function executes the learning operation to inject the learning spray of the fuel to calculate the actual injection quantity a given number of times at each of the learning pressures for each of the fuel injectors to determine the injection correction value. When a standard deviation of the actual injection quantities, as determined to calculate the injection correction value at one of the learning pressures, exceeds a given acceptable value, the learning error determining function may determine that there is the error in the injection correction value.

The learning control function may be designed to execute the learning operation to inject the learning spray of the fuel to calculate the actual injection quantity a given number of times at each of the learning pressures for each of the fuel injectors to determine the injection correction value while changing an injection duration for which each of the fuel injectors sprays the fuel in each of the learning operations. The learning control function may estimate an injection characteristic of each of the fuel injectors using combinations of the actual injection quantities and the injection durations and calculate the injection correction values based on the injection characteristic. When the injection characteristic is out of a given range, the learning error determining function determines that there is the error in the injection correction value.

When the learning error determining function determines that there are a plurality of the errors in the injection correction values, as derived for one of the fuel injectors, the malfunction specifying function specifies the malfunction with regard to a corresponding one of the fuel injectors as being occurring.

When the learning error determining function determines that there are a plurality of the errors in the injection correction values, as derived at one of the learning pressures, the malfunction specifying function specifies the malfunction with regard to the internal combustion engine as being occurring.

When the learning error determining function determines that there are a plurality of the errors in the injection correction values, as derived at two or more of the learning pressures, the malfunction specifying function specifies the malfunction with regard to the internal combustion engine as being occurring.

When there are ones of the injection correction values which are determined to have the errors, respectively, the malfunction specifying function specifies the malfunction with regard to the fuel injection system as being occurring. This is achieved by steps 360 and 370 in FIG. 3(*b*).

When it is determined that there is the error in one of the injection correction values, the learning error determining function relearns the one of the injection correction value through an operation of the learning control function.

When the learning error determining function determines that the relearned injection correction value has an error, the malfunction specifying function specifies the malfunction as being occurring with regard to the one of the fuel injectors which corresponds to the relearned injection correction value.

When the learning error determining function determines in a cycle that the number of the injection correction values, which are derived at one of the learning pressures and each of which is determined to have the error, is greater than a given value of two or more, the malfunction specifying function determines a pressure malfunction as being occurring which is the malfunction with regard to an operation of the internal combustion engine at the one of the learning pressures. After the one of the injection correction value is relearned, the learning error determining function decreases the given value used to determining whether the pressure malfunction is occurring or not at the one of the learning pressures in a subsequent cycle. This ensures the accuracy in determining the presence of the pressure malfunction at the one of the learning pressures, as selected to be relearned in a subsequent cycle.

When the pressure malfunction is determined as being occurring before and after the learning error determining function relearns the one of the injection correction value through the operation of the learning control function, the malfunction specifying function specifies the pressure malfunction as having been occurred. This is achieved by a sequence of steps 270 to 350 in FIG. 3(*b*).

The learning error determining function may be designed to make determinations of whether there are the errors in the injection correction values or not which are calculated at the respective learning pressures for each of the fuel injectors. The malfunction specifying function analyzes results of the determinations made by the learning error determining function to determine whether different types of malfunctions are occurring or not. When it is determined that the different types of malfunctions are occurring, the malfunction specifying function selects one of the different types of malfunctions which is the highest in warning priority and outputs a signal indicative thereof.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figures 1, 2:
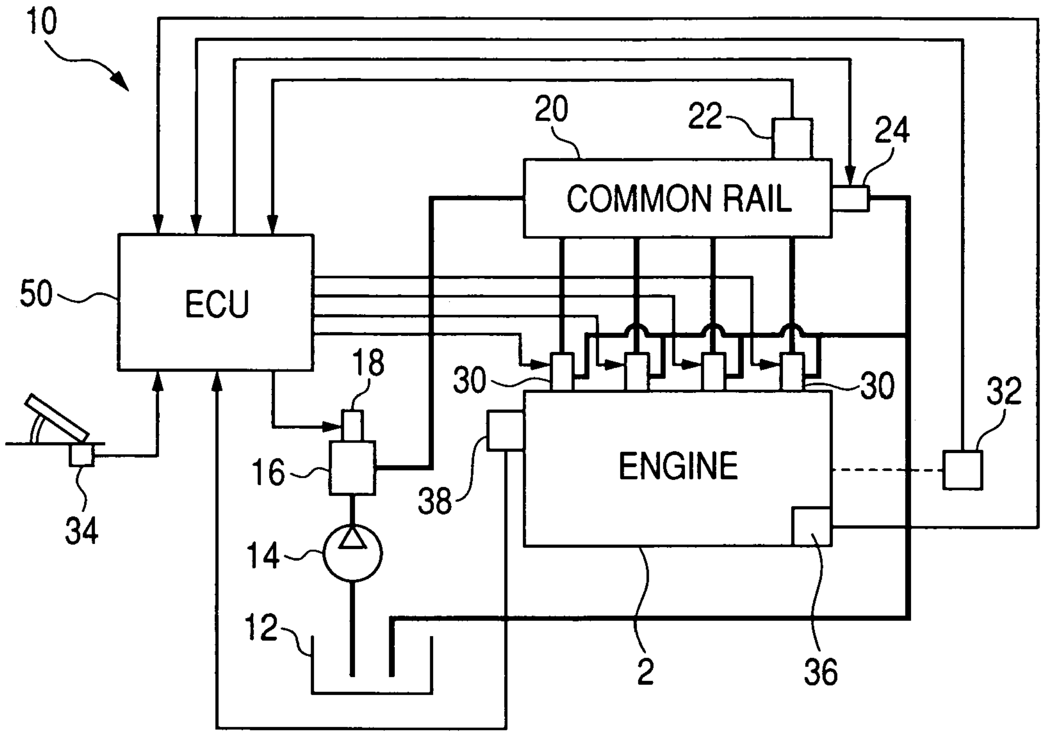
FIG. 1 is a block diagram which illustrates a fuel injection system according to the invention.
FIG. 2 is a view which shows a learned value data map listing injection correction values (i.e., learned values), one calculated in each of learning ranges for each of cylinders of an internal combustion engine.

Referring to the drawings, particularly to FIG. 1, there is shown an accumulator fuel injection system 10 according to the invention.

The accumulator fuel injection system 10, as referred to herein, is designed to supply fuel to, for example, an automotive four-cylinder diesel engine 2 and essentially includes a common rail 20, fuel injectors 30, and an electronic control unit (ECU) 50. The common rail 20 works as an accumulator which stores therein the fuel at a controlled high pressure. The fuel injectors 30 are installed one in each of cylinders of the diesel engine 2 and work to spray the fuel, as supplied from the common rail 20, into combustion chambers of the diesel engine 2. The ECU 50 works to control a whole operation of the fuel injection system 10.

The fuel injection system 10 also includes a feed pump 14 and a high-pressure pump 16. The feed pump 14 works to pump the fuel out of a fuel tank 12 and feed it to the high-pressure pump 16. The high-pressure pump 16 works to pressurize and deliver the fuel to the common rail 20.

The high-pressure pump 16 is of a typical structure in which a plunger is reciprocated following rotation of a cam of a camshaft of the diesel engine 2 to pressurize the fuel sucked into a pressure chamber thereof. The high-pressure pump 16 is equipped with a suction control valve 18 which control the flow rate of fuel to be sucked from the feed pump 14 when the plunger is in a suction stroke.

The common rail 20 has installed therein a pressure sensor 22 which measures the pressure of fuel in the common rail 20 (which will also be referred to as a rail pressure below) and a pressure reducing valve 24 which drains the fuel from the common rail 20 to the fuel tank 12 to reduce the rail pressure.

The fuel injection system 10 also includes a speed sensor 32, an accelerator position sensor 34, a coolant temperature sensor 36, and an intake air temperature sensor 38. The speed sensor 32 works to measure the speed NE of the diesel engine 2. The accelerator position sensor 34 work to measure a driver's effort on or position ACC of an accelerator pedal (which corresponds to an open position of a throttle valve). The coolant temperature sensor 36 works to measure the temperature THW of coolant of the diesel engine 2. The intake air temperature sensor 38 works to measure the temperature TA of intake air charged into the diesel engine 2.

The ECU 50 is implemented by a typical microcomputer made up of a CPU, a ROM, and a RAM. The CPU works to implement a control program stored in the ROM to control the whole operation of the fuel injection system 10.

The ECU 50 samples outputs from the pressure sensor 22, the sensors 32, 34, 36, and 38 and controls the pressure in the common rail 20, the quantity of fuel to be sprayed form the fuel injectors 30 and injection timings of the fuel injectors 30.

Specifically, the ECU 50 works (a) to calculate a target pressure in the common rail 20 (i.e., a target pressure of fuel to be sprayed from the fuel injectors 30 which will also be referred to as a target injection pressure below) based on the operating conditions of the diesel engine 2 in a known manner and control energization of the suction control valve 18 and the pressure reducing valve 24 to bring the pressure in the common rail 20, as measured by the pressure sensor 22, into agreement with the target pressure in a feedback control mode (which will also be referred to as common rail pressure control below) and (b) to calculate a target quantity of fuel to be sprayed from the fuel injectors 30 based on the operating conditions of the diesel engine 2 and to open each of the fuel injectors 30 at a given injection timing for an injection duration, as selected as a function of the target quantity to spray the fuel into one of the cylinders of the diesel engine 2 in a regular fuel injection control mode (which will also be referred to as fuel injection control below).

The ECU 50 is also designed to perform the pilot injection, as described above, prior to the main injection in the regular fuel injection control mode. Usually, the accuracy in spraying the fuel through each of the fuel injectors 30 in the pilot injection mode greatly depends upon a deviation of a pulse width of a drive signal to be outputted from the ECU 50 to each of the fuel injectors 30 (i.e., an on-duration for which each of the fuel injectors 30 is to be kept opened, in other words, a target quantity of fuel to be sprayed from each of the fuel injectors 30) from the quantity of fuel actually sprayed from the fuel injector 30 (will also be referred to as an actual injection quantity or injection quantity Q below).

In order to compensate for the above target-to-actual injection quantity deviation, the ECU 50 stores therein a learned value data map listing learned values G that are injection correction values required to correct the on-durations of (i.e. the pulse widths of the drive signals to be outputted to) the fuel injectors 30 to eliminate the target-to-actual injection quantity deviation. In the regular fuel injection control mode, the ECU 50 selects one of the injection correction values to correct the on-duration of a corresponding one of the fuel injectors 30 in the pilot injection mode so as to bring the actual injection quantity into agreement with the target quantity.

FIG. 2 illustrates the learned value data map which lists the injection correction values Gn1 to Gn4 (i.e., the learned values), one calculated in each of learning ranges classified by discrete levels of the pressure of fuel to be sprayed from the injectors 30 (i.e., the pressure in the common rail 20) in an injection quantity learning mode, as will be described later in detail. The learning ranges are predefined for the respective cylinders #1, #2, #3, and #4 of the diesel engine 2. The levels of the pressure of fuel to be sprayed in the injection quantity learning mode will also be referred to as learning pressures below. The injection correction values Gn1 to Gn4 (generally denoted by G) are initially reset to factory defaults and updated in the injection quantity learning mode which is entered when a given learning condition is encountered.

Figure 3A:
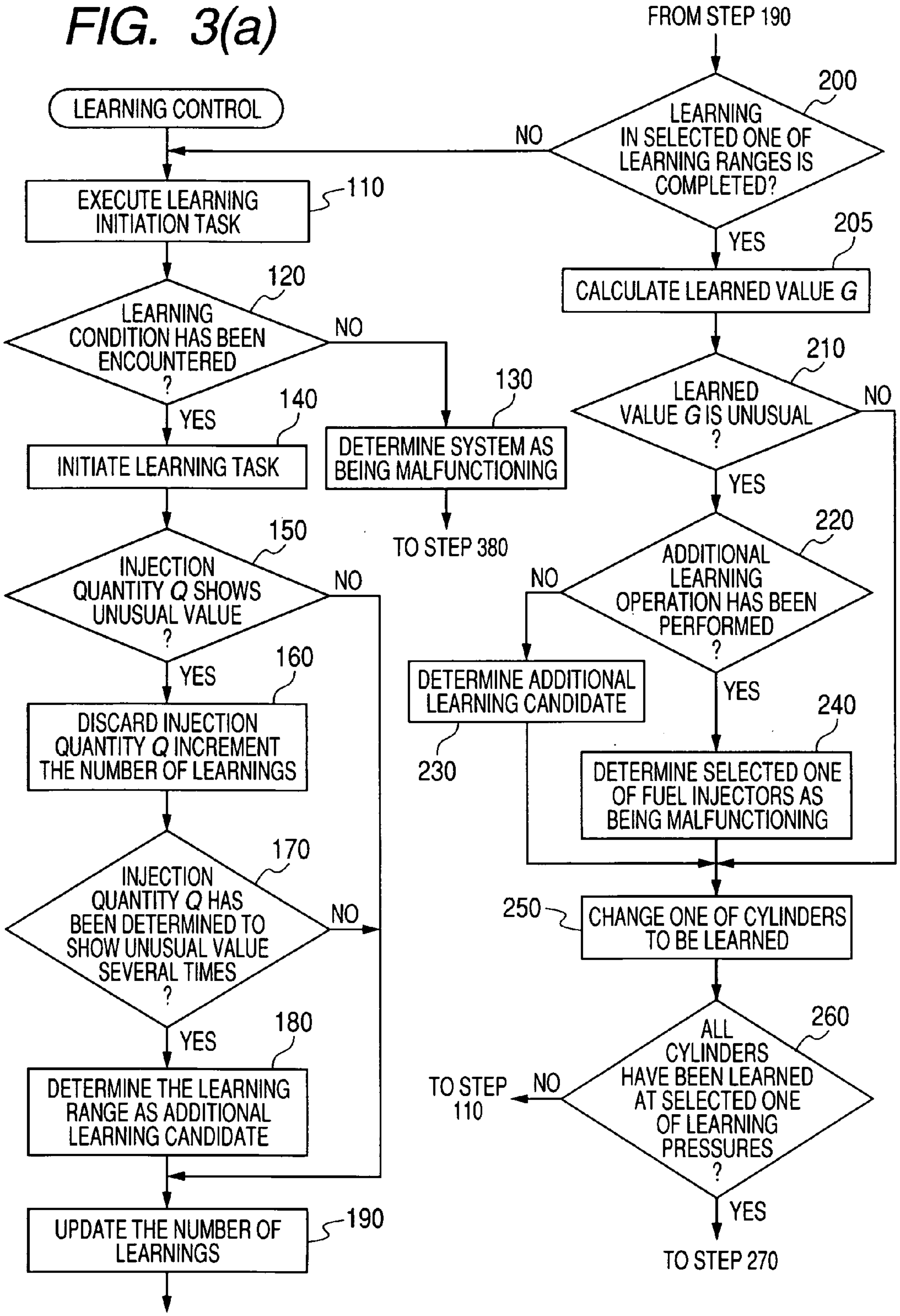
FIGS. 3(*a*) and 3(*b*) show a flowchart of a learning control program executed by the fuel injection system of FIG. 1 to learn an actual injection quantity that is the quantity of fuel expected to have been sprayed actually from each of fuel injectors and analyze results of such learning operations to specify malfunctions occurring in the fuel injection system and internal combustion engine.
Figure 3B:
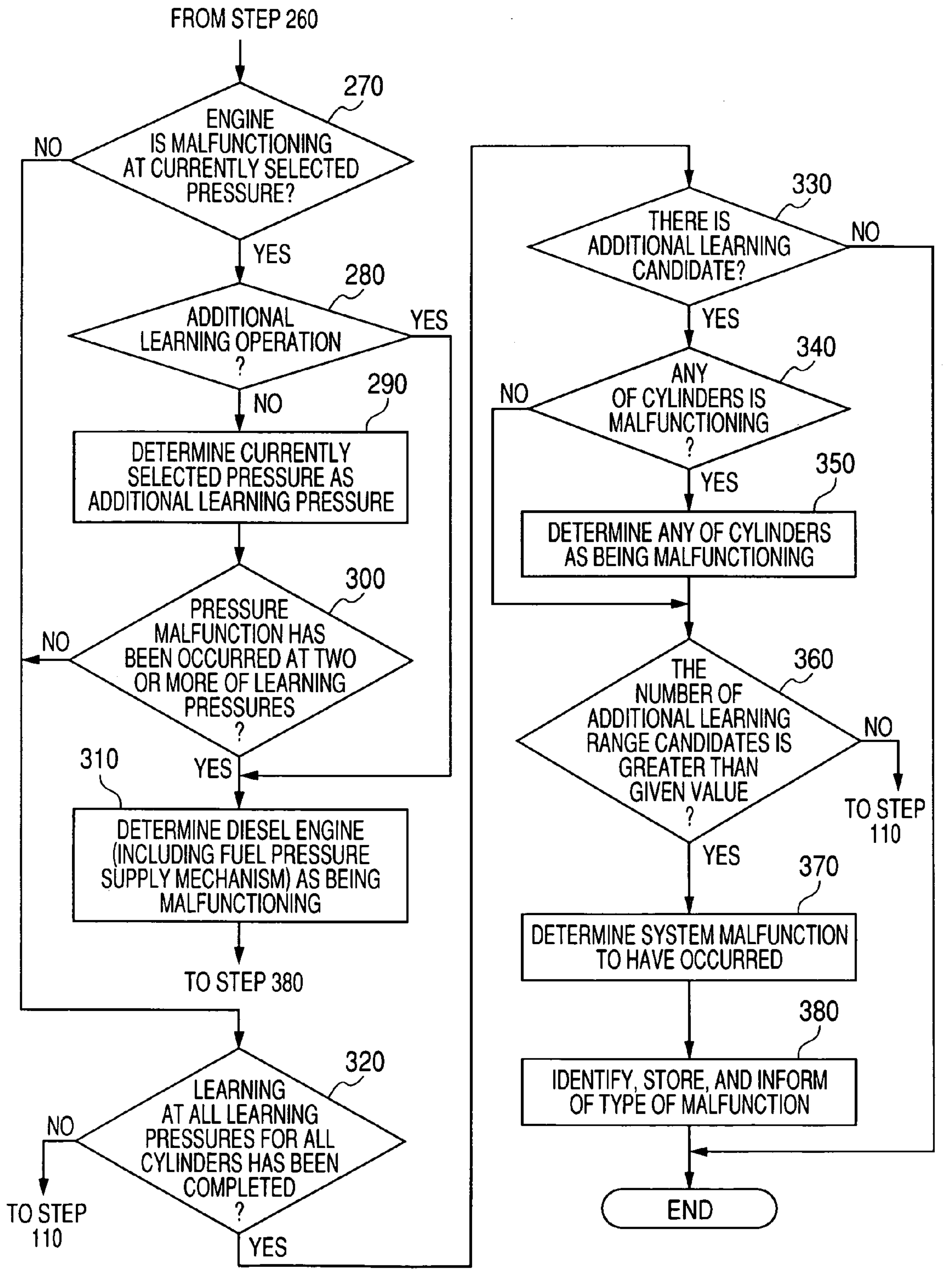

FIGS. 3(*a*) and 3(*b*) illustrate a flowchart of a sequence of logical steps or learning control/malfunction specifying program to be executed by the ECU 50 to determine the actual injection quantity Q and the learned value G within each of the pressure ranges for each of the fuel injectors 30 and to monitor the malfunction occurring in the fuel injection system 10 (including the diesel engine 2) using the learned value G and the actual injection quantity Q.

When the ECU 50 enters the injection quantity learning mode, the routine proceeds to step 110 wherein a learning initiation task is executed to search or select one of the learning ranges in which the injection correction value is to be calculated in this program cycle, determine the pressure of the fuel to be sprayed in the selected one (i.e., a corresponding one of the learning pressures) as a target pressure in the common rail 20, and regulate the pressure in the common rail 20 to the target pressure through the common rail pressure control, as described above.

The routine proceeds to step 120 wherein it is determined whether the learning condition has been met within a predetermined learning period of time or not.

Specifically, when the pressure in the common rail 20 has reached the target pressure, the diesel engine 2 is decelerating, and no fuel is being sprayed into the diesel engine 2, the ECU 50 determines that the learning condition is encountered. If a NO answer is obtained in step 120 meaning that the learning condition is not met, then the routine proceeds to step 130 wherein it is determined that the fuel injection system 10 has failed to regulate the pressure in the common rail 20 or has some difficulty in initiating the learning control/malfunction specifying program properly, and such a fact is stored in the RAM as a system malfunction. The routine the proceeds to step 380, as will be described later.

Alternatively, if a YES answer is obtained in step 120 meaning that the learning condition has been met, then the routine proceeds to step 140 wherein a learning task is initiated.

The learning task is to select one of the fuel injectors 30 installed in one of the cylinders #1 to #4 of the diesel engine 2 which is to be learned in the injection correction value and instruct it to spray a single jet of fuel which is identical in quantity with that to be sprayed in the pilot injection event. Additionally, the ECU 50 samples the output of the speed sensor 32 to determine the speed of the diesel engine 2 and a change in speed thereof arising from the spraying of the fuel and calculate the output torque of the diesel engine 2 using the speed and the change thereof in a known manner to determine the actual injection quantity Q (i.e., the quantity of fuel expected to have been sprayed actually from the one of the fuel injectors 30).

The routine proceeds to step 150 wherein it is determined whether the actual injection quantity Q, as derived in step 140, is out of an allowable range or not, in other words, whether the actual injection quantity Q shows an unusual or abnormal value or not. If a NO answer is obtained meaning that the actual injection quantity Q is in the allowable range, then the routine proceeds directly to step 190 wherein a learning count value indicating the number of times the operation in step 140 has been performed, that is, the number of learnings is updated or incremented. The routine proceeds to step 200 wherein it is determined whether the learning count value indicating the number of learnings has reached a preselected value of not, that is, whether the learning of the actual injection quantity Q from the selected one of the fuel injectors 30 in the selected one of the learning ranges has been completed or not.

Specifically, the ECU 50 is designed to perform the operation in step 140 a given number of times to sample the actual injection quantity Q the same times in each of the learning rages (i.e., at each of the learning pressures) for each of the fuel injectors 30. The ECU 50 determines in step 200 whether the number of times the operation in step 140 has been performed has reached the preselected value or not to determine whether the learning of the actual injection quantity Q in the selected one of the learning ranges has been completed or not.

If a NO answer is obtained in step 150 meaning that the actual injection quantity Q has the abnormal value, then the routine proceeds to step 160 wherein the actual injection quantity Q, as derived in step 140, is discarded or excluded from calculating the learned value G (i.e., the injection correction value). The learning count value indicating the number of learnings, as used in step 200 to determine whether the learning is completed or not, is incremented by one (1).

The routine proceeds to step 170 wherein it is determined whether the determination that the value of the actual injection quantity Q from the selected one of the fuel injectors 30 at the selected one of the learning pressures is abnormal has been made a plurality of times or not. If a YES answer is obtained, then the routine proceeds to step 180 wherein the one of the learning ranges, as selected in this program cycle, is determined as an additional learning range candidate in which the actual injection quantity Q is to be determined again a required number of times in a subsequent program execution cycle following step 360, as will be described later in detail, and stored in the RAM. Alternatively, if a NO answer is obtained, then the routine proceeds directly to step 190.

After the one of the learning ranges, as selected in this program cycle, is determined as the additional learning range candidate in step 180, the ECU 50 increments, in step 190, the learning count value a plurality of times to suspend the learning of the actual injection quantity Q in the selected one of the learning ranges immediately and then initiates the learning of the actual injection quantity Q in a subsequent one of the learning ranges.

After step 190, the routine proceeds to step 200 wherein it is, as described above, determined whether the learning of the actual injection quantity Q in the selected one of the learning ranges has been completed or not. If a NO answer is obtained, then the routine returns back to step 110 to initiate the learning of the actual injection quantity Q in the selected one of the learning ranges again.

Alternatively, if a YES answer is obtained in step 200 meaning that the learning of the actual injection quantity Q in the selected one of the learning ranges is completed, then the routine proceeds to step 205 wherein the learned value G (i.e. the injection correction value) required to bring the quantity of fuel actually sprayed from a corresponding one of the fuel injectors 30 into agreement with the target quantity is determined using the values of the actual injection quantity Q, as derived in the selected one of the learning ranges. For example, the ECU 50 estimates an injection characteristic (i.e., an actual injection quantity-to-on duration relation) of the fuel injector 30 using the values of the actual injection quantity Q and calculates the injection correction value based a difference between the injection characteristic and a designer-predefined basic injection characteristic in a known manner.

The routine proceeds to step 210 wherein it is determined whether the learned value G, as derived in step 205, is out of an allowable range defined between given upper and lower guard values or not. If a NO answer is obtained meaning that the learned value G is within the allowable range so that it is an acceptable value, then the routine proceeds directly to step 250. Alternatively, if a YES answer is obtained, then the routine proceeds to step 220 wherein it is determined whether the learned value G, as calculated in step 205, has been derived by an additional learning operation on the additional learning range candidate, as determined in step 180, or not.

If a NO answer is obtained in step 220, then the routine proceeds to step 230 wherein one of the learning ranges in which the learned value G has been analyzed as being unacceptable in step 210 is determined as the additional learning range candidate for the selected one of the fuel injectors 30 and stored in the RAM. The routine then proceeds to step 250.

Alternatively, if a YES answer is obtained in step 220 meaning that the learned value G, which has been calculated in step 205 and concluded as being unacceptable in step 210, has been derived by the additional learning operation, then the routine proceeds to step 240 wherein it is determined that one of the fuel injectors 30, as now selected to be learned in the actual injection quantity Q, is malfunctioning. Such a fact is stored in the RAM as a cylinder malfunction. The routine then proceeds to step 250.

In step 250, one of the cylinders #1 to #4 of the diesel engine 2 in which the actual injection quantity Q is to be learned subsequently is selected. The routine proceeds to step 260 wherein it is determined whether all the cylinders #1 to #4 (i.e., all the fuel injectors 30) have been learned to determine the actual injection quantity Q at the same learning pressure, i.e., one of the learning pressures, as selected in this program cycle, or not. If a NO answer is obtained meaning that the all the cylinders #1 to #4 have not yet been learned, then the routine returns back to step 110 to initiate the learning operation on a subsequent one of the cylinders #1 to #4 (i.e., a subsequent one of the fuel injectors 30) at the same learning pressure as that at which the actual injection quantity Q has ever been learned.

Alternatively, if a YES answer is obtained in step 260 meaning that all the cylinders #1 to #4 have been learned at the currently selected one of the learning pressures, then the routine proceeds to step 270 wherein of the learned values G which have ever been derived in step 205 at the currently selected one of the learning pressures for the cylinders #1 to #4 of the diesel engine 2 (i.e., the fuel injectors 30), the number of ones which have been decided to be unacceptable in step 210 is greater than a given value (e.g., three) or not. This determination is made to determine whether the diesel engine 2 is malfunctioning at the currently selected one of the learning pressures or not.

If a YES answer is obtained in step 270 meaning that there is the possibility that the diesel engine 2 is malfunctioning, in other words, the fuel injection system 10 has failed to regulate the pressure of fuel to be sprayed into the diesel engine 2 to the currently selected one of the learning pressures, or some failure is occurring which is common to the cylinders of the diesel engine 2 at the currently selected one of the learning pressures, which will also be referred to as a pressure malfunction below, then the routine proceeds to step 280 wherein it is determined whether the learned values G, as derived in step 205 for the cylinders #1 to #4 of the diesel engine 2 at the currently selected one of the learning pressures, have resulted from the additional learning operations or not, in other words, it is determined whether the current program execution cycle is a cycle in which the additional learning operation is being performed or not. If a NO answer is obtained meaning that the additional learning operation has not been performed in the current program execution cycle, then the routine proceeds to step 290 wherein one(s) of the learning ranges in which the learned value(s) G has (have) been analyzed as being unacceptable is (are) determined as the additional learning range candidate(s) for the selected one of the fuel injectors 30. The routine then proceeds to step 300.

In step 290, in order to ensure the accuracy in determining the presence of the pressure malfunction at the learning pressure of one of the learning ranges which has been determined as the additional learning range candidate, the value (e.g. three) to be compared in step 270 in a subsequent execution cycle of the program with the number of ones of the learned values G decided to be unacceptable in step 210 may be decreased to, for example, one (1).

The routine proceeds to step 300 wherein it is determined whether the determination in step 270 that the pressure malfunction has occurred have ever been made at two or more of the learning pressures or not. If a YES answer is obtained, then the routine proceeds to step 310 wherein it is determined that the diesel engine 2 is failing in operation thereof, that is, the diesel engine 2 is malfunctioning itself or a fuel pressure supply mechanism including the common rail 20, the feed pump 14, the high-pressure pump 16, etc. is failing to spray the fuel at a target pressure. Such a fact is stored as an engine malfunction in the RAM. The routine then proceeds to step 380 which will be described later in detail.

Alternatively, if it is determined in step 280 that the current program execution cycle is the cycle of the additional learning operation, it means that the determination that the pressure malfunction is occurring at the currently selected one of the learning pressures has been made through the two-time learning operations. Specifically, if a YES answer is obtained in step 280, it concludes in step 310 that there is no doubt that the fuel pressure supply mechanism including the common rail 20, the feed pump 14, the high-pressure pump 16, etc. is failing to spray the fuel at a target pressure, thus resulting in a failure in operation of the diesel engine 2. Such a fact is stored in the RAM.

If a NO answer is obtained in step 270 meaning that the diesel engine 2 is operating properly at the currently selected one of the learning pressures, then the routine proceeds to step 320 wherein it is determined whether the learning of the actual injection quantity Q has been completed at all the learning pressures for all the cylinders #1 to #4 of the diesel engine 2 or not. If a NO answer is obtained, then the routine returns back to step 110 to change the currently selected one of the learning pressures to another and initiate the learning operation for all the cylinders #1 to #4 in the same manner, as described above.

Alternatively, if a YES answer is obtained in step 320 meaning that the learning of the actual injection quantity Q has been completed at all the learning pressures for all the cylinders #1 to #4 of the diesel engine 2, then the routine proceeds to step 330 wherein it is determined whether there is(are) the additional learning range candidate(s) or not. If a NO answer is obtained meaning that the learned values G have been derived properly at all the learning pressures for all the cylinders #1 to #4, then the routine terminates. Alternatively, if a YES answer is obtained, then the routine proceeds to step 340 wherein it is determined whether there are the learned values G or not which have been derived at any of the cylinders #1 to #4 of the diesel engine 2 (i.e., the any of the fuel injectors 30) and determined to be unacceptable at more than a given number of the learning pressures.

If a YES answer is obtained in step 340, then the routine proceeds to step 350 wherein a result of the determination in step 340 is stored in the RAM as the cylinder malfunction occurring at a plurality of the learning pressures. Alternatively, if a NO answer is obtained, then the routine proceeds directly to step 360.

In step 360, it is determined whether the number of the additional learning range candidates is greater than or equal to a given value or not to determine whether the number of ones of the learning ranges in each of which the learned value G is determined to be unacceptable is two or more.

If a YES answer is obtained meaning that the number of ones of the learning ranges in each of which the learned value G is to be determined again is greater than or equal to the given value, then the routine proceeds to step 370 wherein it is determined that the fuel injection system 10 itself is malfunctioning, for example, the fuel injection system 10 is subjected to some failure in regulating the pressure in the common rail 20 correctly and/or the diesel engine 2 is failing in operation correctly, and such a fact is stored in the RAM as the system malfunction. Alternatively, if a NO answer is obtained meaning that the number of the ones of the learning ranges has not yet reached the given value, then the routine returns back to step 110 to execute the learning operation on each of the additional learning range candidates.

After step 370, 310, or 130, the routine proceeds to step 380 wherein ones of the cylinder malfunction, the pressure malfunction, the engine malfunction, and the system malfunction, as stored through the above sequence of steps, are read out of the RAM, and which of them is the highest in warning priority is identified in the priority order of the system malfunction, the engine malfunction, the pressure malfunction, and the cylinder malfunction. The routine then terminates. The identified one is stored in the RAM or another storage medium and may be visually displayed to a vehicle operator or a vehicle inspector.

As apparent from the above discussion, the fuel injection system 10 is designed to calculate the injection correction value (i.e., the learned value G) required to correct the quantity of fuel to be sprayed in the pilot injection event at each of the learning pressures for each of the cylinders #1 to #4 of the diesel engine 2 (i.e.) each of the fuel injectors 30). Each time the learned value G is derived, the fuel injection system 10 determines whether the learned value G is acceptable or abnormal. When the learned value(s) G is(are) determined to be abnormal, the fuel injection system 10 specifies the type of a malfunction(s) indicated by the mode in which such an abnormality(ties) has occurred and stores and visually indicates it.

When one of the actual injection quantities Q, as derived by the learning operation executed several times in each of the learning ranges (i.e., at each of the learning pressure), has an unusual value, the fuel injection system 10 discards it and performs the learning operation additionally. This enables the learned value G (i.e., the injection correction value) to be calculated accurately using only the actual injection quantities Q as having been determined correctly without decreasing them undesirably, which prevents the learned value G from being abnormal due to noise to avoid an error in determining that some malfunction is occurring in the fuel injection system 10.

When some of the actual injection quantities Q, as derived at one of the learning pressures, are determined to be abnormal, the fuel injection system 10 suspends the learning operation at the one of the learning pressures, initiates the learning operation at another of the learning pressures, and resumes the learning operation at the one of the learning pressures after the learned values G are derived at all the learning pressures, thereby improving the accuracy in calculating the learned values G for a decreased period of time.

When the learned value G is determined to be abnormal or the pressure malfunction is determined to be occurring based on the learned values G, as determined to be abnormal, the fuel injection system 10 recalculates the learned value(s) G through the additional learning operations), thereby monitoring each of the above described malfunctions through the two-time learning operations, thereby improving the accuracy in determining the occurrence of the malfunctions.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended clams.

For example, the determination of whether the learned value G is abnormal or not is made using the upper and lower guard values, but however, when a standard deviation of the actual injection quantities Q is greater than a given acceptable value, the fuel injection system 10 may determine that the learned value G is abnormal.

Figure 4:
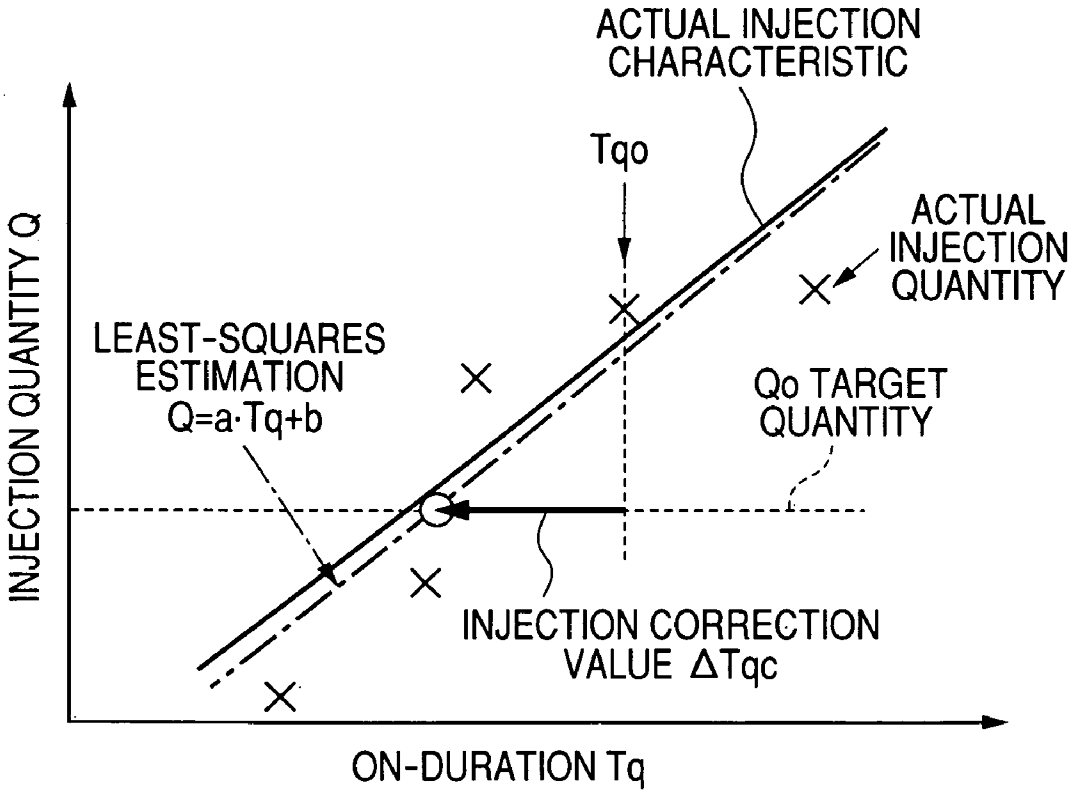
FIG. 4 is a view which shows an injection characteristic of a fuel injector which is a relation between an on-duration for which the fuel injector is kept opened and the quantity of fuel sprayed actually from the fuel injector.

The ECU 50 may be designed to change, as illustrated in FIG. 4, an on-duration Tq for which each of the fuel injectors 30 is kept opened each time the operation in step 140 is executed to disperse the quantities of fuel actually sprayed from the fuel injector 30 (i.e., the actual injection quantity Q) around a target quantity Qo, calculate or estimate an actual injection characteristic of the fuel injector 30 (i.e., an actual injection quantity-to-on duration relation) by means of the least squares method using combinations of the actual injection quantities Q and the corresponding on-durations Tq, determine a correction value ΔTqc for a designer-selected basic on-duration Tqo using the injection characteristic, and define the correction value ΔTqc as the learned value G. In this case, the ECU 50 may determine whether an inclination of the injection characteristic lies within a given range defined across a basic injection characteristic of the fuel injector 30 or not to determine whether the learned value G is abnormal or not.

What is claimed is:

1. A fuel injection system for a multi-cylinder internal combustion engine comprising:

fuel injectors each of which sprays fuel into one of cylinders of an internal combustion engine; and an injection controller working to perform a learning control function, a learning error determining function, and a malfunction specifying function, the learning control function being executed when the engine is placed in a given condition to regulate a pressure of fuel to be sprayed from each of the fuel injectors to each of given learning pressures, the learning control function injecting a learning spray of the fuel into the engine to sample a resulting change in operating condition of the engine to calculate an actual injection quantity that is the quantity of fuel expected to have been sprayed from the each of the fuel injectors and calculating an injection correction value required to bring the actual injection quantity toward a target quantity, the learning error determining function being to make a determination of whether there is an error in each of the injection correction values or not which is calculated at one of the learning pressures for each of the fuel injectors, the malfunction specifying function being to analyze a result of the determination made by the learning error determining function to specify a malfunction occurring with regard to the fuel injection system.

2. A fuel injection system as set forth in claim 1, wherein the learning control function executes a learning operation to inject the learning spray of the fuel to calculate the actual injection quantity at each of the learning pressures for each of the fuel injectors, the learning control function determining whether a learning condition in which the given condition is encountered and the each of the learning pressures is reached is met or not each time the learning operation is executed, and wherein when the malfunction specifying function determines that the learning condition continues not to be met for a given period of time, said injection controller stops the learning control function from being performed to determine that the malfunction is occurring in the fuel injection system.

3. A fuel injection system as set forth in claim 1, wherein the learning control function executes a learning operation to inject the learning spray of the fuel to calculate the actual injection quantity a given number of times at each of the learning pressures for each of the fuel injectors to determine the injection correction value, the learning control function making a determination of whether a value of the actual injection quantity is abnormal or not each time the learning operation is executed, when the value of the actual injection quantity is determined to be abnormal, the learning control function discarding the value of the actual injection quantity and performing the learning operation additionally to recalculate the discarded value of the actual injection quantity.

4. A fuel injection system as set forth in claim 3, wherein the learning control function executes the learning operation the given number of times at each of learning ranges to determine the injection correction value, each of the learning ranges being defined in terms of one of the learning pressures for one of said fuel injectors, when the learning control function determines a plurality of times that the value of the actual injection quantity is abnormal at one of the learning ranges the learning control function determines the one of the learning ranges as an additional learning pressure candidate at which the learning operation is to be executed to calculate the actual injection quantity again to determine the injection correction value and initiates the learning operation at another of the learning pressures, and wherein when the learning operations at all the learning pressures for all the fuel injectors have been completed, the learning control function initiates the learning operation at the additional learning pressure candidate to learn the injection correction value.

5. A fuel injection system as set forth in claim 1, wherein when the injection correction value exceeds a given guard value, the learning error determining function determines that there is the error in the injection correction value.

6. A fuel injection system as set forth in claim 1, wherein the learning control function executes a learning operation to inject the learning spray of the fuel to calculate the actual injection quantity a given number of times at each of the learning pressures for each of the fuel injectors to determine the injection correction value, and wherein when a standard deviation of the actual injection quantities, as determined to calculate the injection correction value at one of the learning pressures, exceeds a given acceptable value, the learning error determining function determines that there is the error in the injection correction value.

7. A fuel injection system as set forth in claim 1, wherein the learning control function executes a learning operation to inject the learning spray of the fuel to calculate the actual injection quantity a given number of times at each of the learning pressures for each of the fuel injectors to determine the injection correction value while changing an injection duration for which each of the fuel injectors sprays the fuel in each of the learning operations, the learning control function estimating an injection characteristic of each of the fuel injectors using combinations of the actual injection quantities and the injection durations and calculating the injection correction values based on the injection characteristic and wherein when the injection characteristic is out of a given range, the learning error determining function determines that there is the error in the injection correction value.

8. A fuel injection system as set forth in claim 1, wherein when the learning error determining function determines that there are a plurality of the errors in the injection correction values, as derived for one of the fuel injectors, the malfunction specifying function specifies the malfunction with regard to a corresponding one of said fuel injectors as being occurring.

9. A fuel injection system as set forth in claim 1, wherein when the learning error determining function determines that there are a plurality of the errors in the injection correction values, as derived at one of the learning pressures, the malfunction specifying function specifies the malfunction with regard to the internal combustion engine as being occurring.

10. A fuel injection system as set forth in claim 1, wherein when the learning error determining function determines that there are a plurality of the errors in the injection correction values, as derived at two or more of the learning pressures, the malfunction specifying function specifies the malfunction with regard to the internal combustion engine as being occurring.

11. A fuel injection system as set forth in claim 1, wherein when there are ones of the injection correction values which are determined to have the errors, respectively, the malfunction specifying function specifies the malfunction with regard to the fuel injection system as being occurring.

12. A fuel injection system as set forth in claim 1, wherein when it is determined that there is the error in one of the injection correction values, the learning error determining function relearns the one of the injection correction value through an operation of the learning control function.

13. A fuel injection system as set forth in claim 12, wherein when the learning error determining function determines that the relearned injection correction value has an error, the malfunction specifying function specifies the malfunction as being occurring with regard to the one of the fuel injectors which corresponds to the relearned injection correction value.

14. A fuel injection system as set forth in claim 12, wherein when the learning error determining function determines in a cycle that the number of the injection correction values, which are derived at one of the learning pressures and each of which is determined to have the error, is greater than a given value of two or more, the malfunction specifying function determines a pressure malfunction as being occurring which is the malfunction with regard to an operation of the internal combustion engine at the one of the learning pressures, and wherein after the one of the injection correction value is relearned, the learning error determining function decreases the given value used to determining whether the pressure malfunction is occurring or not at the one of the learning pressures in a subsequent cycle.

15. A fuel injection system as set forth in claim 14, wherein when the pressure malfunction is determined as being occurring before and after the learning error determining function relearns the one of the injection correction value through the operation of the learning control function, the malfunction specifying function specifies the pressure malfunction as having been occurred.

16. A fuel injection system as set forth in claim 1, wherein the learning error determining function is designed to make determinations of whether there are the errors in the injection correction values or not which are calculated at the respective learning pressures for each of the fuel injectors, wherein the malfunction specifying function analyzes results of the determinations made by the learning error determining function to determine whether different types of malfunctions are occurring or not, wherein when it is determined that the different types of malfunctions are occurring, the malfunction specifying function selects one of the different types of malfunctions which is the highest in priority and outputs a signal indicative thereof.

* * * * *